Sept. 21, 1965    R. M. LOCKWOOD    3,206,926
DEVELOPMENT AND AUGMENTATION OF INTERMITTENT THRUST
PRODUCING FLUID FLOWS
Filed April 19, 1962    2 Sheets-Sheet 1
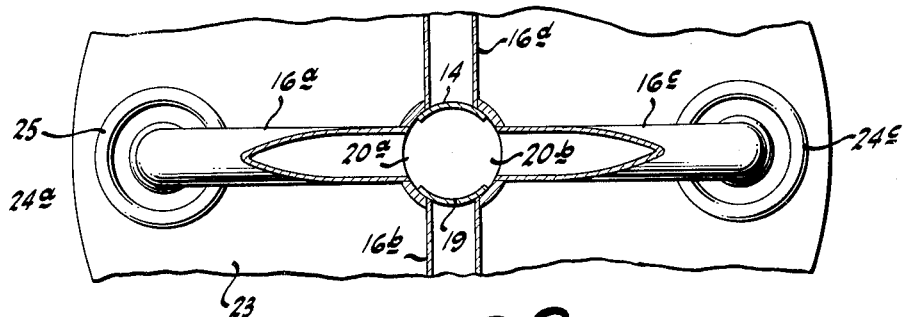
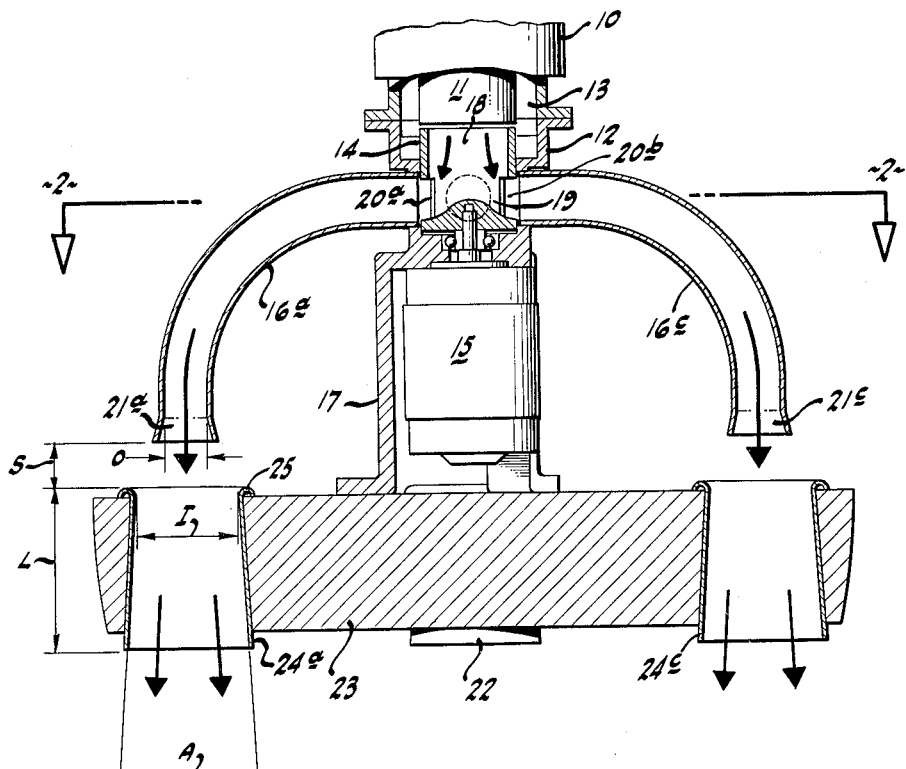
INVENTOR.
RAYMOND M. LOCKWOOD
BY
Bialos + Schlemmer
ATTORNEYS

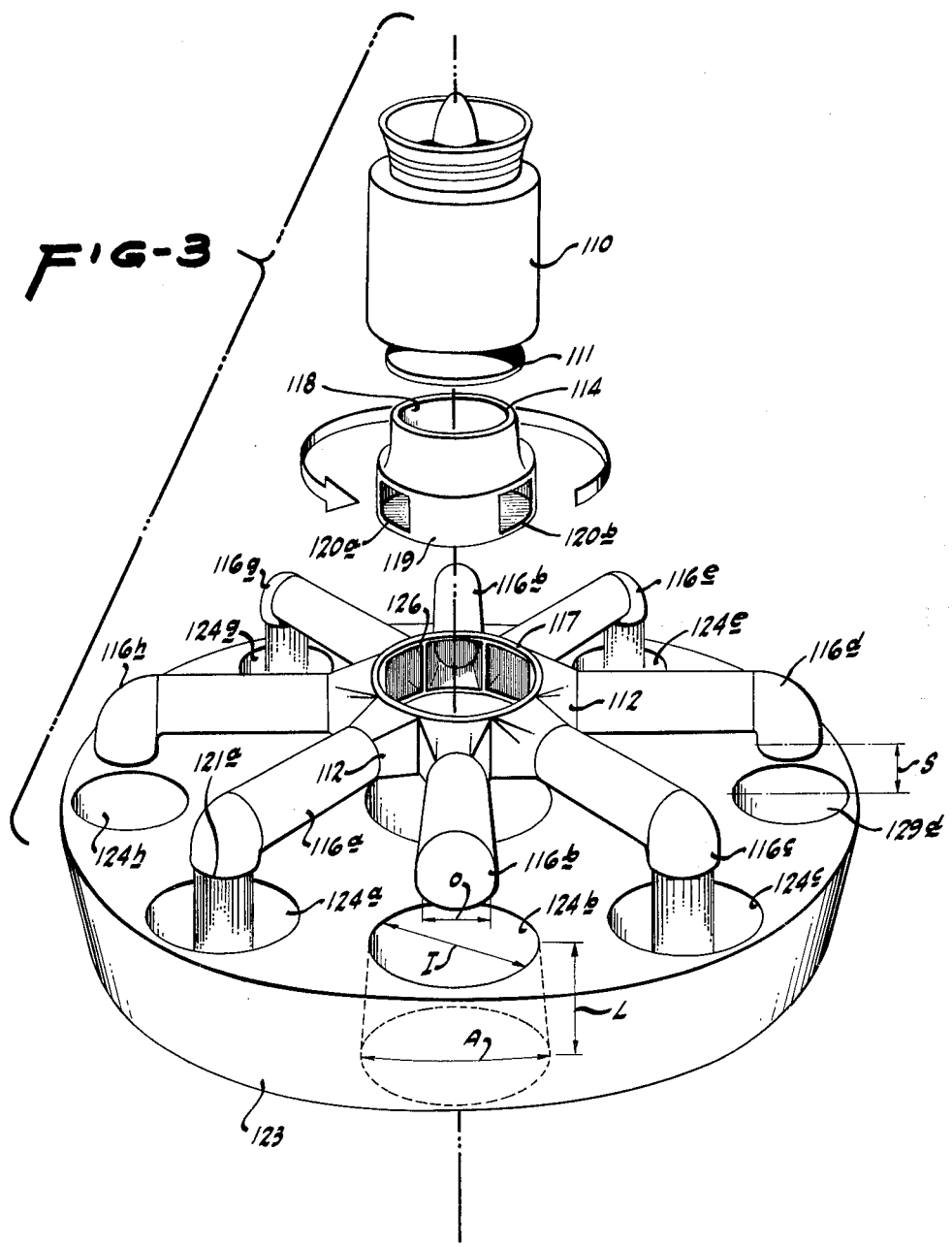

United States Patent Office 3,206,926
Patented Sept. 21, 1965

3,206,926
DEVELOPMENT AND AUGMENTATION OF INTERMITTENT THRUST PRODUCING FLUID FLOWS
Raymond M. Lockwood, Los Altos, Calif., assignor, by mesne assignments, to Hiller Aircraft Company, Inc., Menlo Park, Calif., a corporation of Delaware
Filed Apr. 19, 1962, Ser. No. 188,720
12 Claims. (Cl. 60—35.6)

This application is a continuation-in-part of Serial No. 23,723, filed April 21, 1960, now abandoned.

This invention relates to devices for producing thrust by the discharge of fluid from a nozzle or outlet opening, and more particularly to a system for converting a continuous gaseous flow into an intermittent discharge at such nozzle and for thrust-augmenting the intermittent gaseous discharge therefrom.

It is well known that the thrust obtained by discharging a gaseous fluid from a nozzle or outlet opening can be increased or augmented by causing the gaseous fluid, after such discharge, to flow into and through a generally tubular sleeve oriented in axial alignment with the nozzle. It has been learned, however, that the thrust augmentation achieved in this manner can be materially increased if the thrust-producing gaseous discharge is intermittent and repetitive in character, and provided that certain dimensional relationships are maintained with respect to the length of such augumenters relative to the inlet diameter thereof, the area of such inlet relative to the area of the nozzle thrust outlet, and also with respect to the axial alignment and spacing between such nozzle and the inlet of the augmenter. The critical dimensional relationships are set forth in my copending application, Serial No. 23,723, filed April 21, 1960.

More particularly, as set forth in such copending application, the most efficient thrust augmentation is obtained with an augmenter in which the ratio of the length thereof to its smallest diameter at the inlet opening is in the range of about 1–4.5 to 1, in which the ratio of the cross sectional area of the inlet opening of the augmenter to the cross sectional area of the nozzle thrust opening is in the range of about 3–12 to 1, and in which the axial spacing between the augmenter inlet opening and the discharge nozzle is in the range of about 1–2.5 times the diameter of such nozzle thrust opening. Additionally, the thrust augmentation is found to be markedly increased when the thrust augmenter is tapered to an enlarged outlet end such that the included angle of the taper is in the range of about 4° to 16°.

It is believed that an intermittent gaseous discharge or jet is susceptible to tremendously greater thrust augmentation than a continuously discharging gas or jet for several reasons, the most important of which is that the mass of the total thrust-imparting discharge from the augmenter outlet is materially increased (using augmenters in accordance with the foregoing discussion) in that the thrust augmenter is caused to be refilled with ambient air between the successive cycles of gaseous discharge from the nozzle and ambient air is caused to flow into the nozzle and superfill the same between the successive cycles of gaseous discharge therefrom.

Even though it is significantly advantageous to have an intermittent thrust-producing gaseous discharge, it is in many instances much more convenient or feasible to provide a gas generator (such as a turbo-engine) having a continuous or steady flow gaseous discharge therefrom than it is to provide a generator (such as a pulse jet engine) having an intermittent or pulsating gaseous discharge therefrom; and in view of the advantages with respect to thrust augmentation which are realized by having an intermittent or pulsating gaseous jet discharge, an object of the present invention is in the provision of an improved structure for converting a continuous gaseous flow into an intermittent or pulsating gaseous flow downstream of the engine or gas generator.

Another object of the invention is that of providing an improved structural arrangement for converting a steady gaseous flow into an intermittent flow without creating upstream disturbances—that is, without causing pressure wave disturbances to be propagated upstream to the steady-flow gas generator. Still another object is to provide an arrangement of the type described for converting a steady gaseous flow into a strongly intermittent flow at the thrust discharge outlet of a nozzle structure so as to cause a sudden pressure drop to occur thereat during each cycle of operation (i.e., from the initiation of one pulse or discharge to the initiation of the next subsequent pulse); such pressure drop resulting from a rarefaction wave that travels down the nozzle at sonic speed to the open end or thrust outlet thereof where it causes a pressure drop in the ambient fluid surrounding the opening which induces a flow of ambient fluid back into the nozzle structure.

A further object is in the provision of an arrangement of the character described in combination with a thrust augmenter which is continuously maintain in a fixed, predetermined spacial relationship relative to the discharge nozzle, and which has a predetermined dimensional relationship with respect to such discharge nozzle and also with respect to the ratio of its length to its diameter adjacent the inlet end thereof.

Still a further object is that of providing a thrust-augmented flow converter in which a continuous gaseous flow is changed into a strongly intermittent flow through the gaseous discharge nozzle, and in which such nozzle is a non-rotating component as is the thrust-augmentation structure so that losses due to Coriolis forces are avoided, so that there is no jet blow-by of the gaseous discharge from the nozzle past the augmenter—the augmenter and nozzle discharge outlet being continuously maintained in register, and so that the critical dimensional relationship of the augmenter and discharge outlet are always maintained, thereby taking full advantage of the important pressure drop that occurs in the discharge nozzle between jet pulses and the refilling of the nozzle and thrust augmenter with ambient air. Additional objects and advantages of the invention will become apparent as the specification develops.

Embodiments of the invention are illustrated in the accompanying drawings, in which—

FIGURE 1 is a broken longitudinal sectional view of an exemplary apparatus embodying the invention;

FIGURE 2 is a broken transverse sectional view taken along the plane 2–2 of FIGURE 1; and FIGURE 3 is an exploded perspective view of a modified structure generally similar to that of FIGURE 1, the drive motor assembly being omitted for purposes of clarity.

The exemplary embodiment of the invention shown in FIGURE 1 includes a gas generator 10 which may be of any type, a conventional gas turbine or turbo engine for example, having the characteristic of providing a continuous discharge of thrust-producing gases therefrom. The gas generator or steady-flow engine 10 is equipped with a duct or outlet 11 through which the discharging gases flow, and the outlet is located within a casing or closure 12 defining a chamber 13 therein. Axially aligned with the outlet 11 is a flow distributor or interrupter in the general form of a valve 14 secured to the shaft of a motor 15 so as to be rotatably driven thereby. The motor 15 may be of any conventional type (an air motor or electric motor, for example) operative to rotate the valve 14, and the motor should also be of the variable-speed type, or equivalent means should be provided for selectively altering the rotational velocity thereof, to permit the system to be turned—that is, the angular velocity of the valve 14 related to the natural frequency of the discharge tubes or conduits 16a through 16d. The motor 15 is mounted within a casing 17, and suitable antifriction devices such as the ball bearings illustrated may be employed to rotatably relate the valve 14 and motor shaft to the casing 17. The casings 12 and 17 may be integral or separate components welded or otherwise suitably secured to each other.

The valve 14 has a large central opening or chamber 18 therein axially aligned with the engine outlet 11 and the opening is substantially coextensive therewith in area. At its lower end, the valve is provided with a bottom wall that defines a closure for the opening 18 at one end thereof, and the valve is also provided in the cylindrical side wall thereof with angularly spaced segments 19 that define two diametrically spaced valve outlets 20a and 20b therebetween, each of which communicates with the large central opening 18 and is adapted to communicate with the various conduits 16. The respective planes of the outlet 20 are substantially normal to the longitudinal axis of the opening or chamber 18 so that the gas flowing through the outlets makes a transition of approximately 90° in flow direction in passing therethrough; and to minimize turbulence and reduce the resistance to such transition, the bottom wall of the valve has slightly arcuate surfaces, as shown in FIGURE 1.

In the specific structure shown, there are four conduits 16 arcuately spaced from each other by equal angular distances, namely 90°. The conduits 16 respectively extend through openings provided therefor in the casings 12 and 17 and are rigidly related thereto. By referring to FIGURE 2, it will be seen that the valve outlets 20 are substantially larger in angular length—that is, along the circumferential surface of the valve 14—than the conduits 16 along the corresponding dimension. Consequently, and because the angular spacing between adjacent conduits 16 is less than the angular dimension of the valve outlets, each of the valve outlets is always in communication with at least one of the conduits 16 (as shown in FIGURE 2) and sometimes in communication with two adjacent conduits (16a and 16b, for example) as each outlet is rotated by the valve from registering relation with one conduit to registering relation with the successive conduit.

Each of the conduits 16 is arcuate and terminates in a nozzle having a fluid-discharge thrust opening 21 (the suffixes a through d being used to specifically associate the same with the various conduits 16) having a diameter O. Preferably, each nozzle is tapered or flared outwardly as shown to facilitate the reverse flow of air thereinto. The various discharge nozzles are disposed in parallel alignment and the outlets thereof all face in the same direction so that the thrust forces resulting from the respective discharge of gases therefrom have the same sign or are arithmetically additive. In the specific structure shown, each of the conduits 16 describes an arcuate path of substantially 90°; and consequently, the gaseous discharge from the openings 21 is in the same direction as the gaseous flow through the entire outlet 11.

Secured to the casing 17 in any appropriate manner such as by means of clamp structure 22 is a support member or carrier 23, which in the particular form shown is generally cylindrical. The diameter of the support 23 is such that its extends across all of the conduits 16 and is in spaced apart, facing relation with the nozzle thrust openings 21. The support member 23 is provided with a plurality of tapered openings or passages extending therethrough which are respectively aligned with the various nozzle thrust openings 21; and therefore, in the structure of FIGURES 1 and 2, there are four such openings angularly spaced from each other by 90°.

Respectively mounted in such openings are a plurality of thrust augmenters 24, the suffixes a through d being used to respectively associate the augmenters with the nozzle thrust openings 21a through 21d. Each of the thrust augmenters 24 is a hollow tube having a length L, a minimum diameter I adjacent the mouth or inlet opening thereof, and is spaced from the associated thrust opening 21 by a distance S. Additionally, each thrust augmenter 24 is tapered from the inlet opening thereof to an enlarged outlet opening, and the included angle of such taper is denoted with the letter A. Desirably, each augmenter is flared outwardly adjacent the inlet thereof so as to form a lip 25 which facilitates the flow of ambient air into the augmenter through the inlet thereof, and which also serves to anchor the augmenter in the opening therefor in the support member 23.

The modified form of the invention illustrated in FIGURE 3 is generally similar structurally to the embodiment heretofore described, and in terms of both function and results is the equivalent thereof. Therefore, the corresponding parts are designated with the same numbers used in FIGURES 1 and 2 except that the order thereof has been raised by 100 for purposes of differentiation. The embodiment of FIGURE 3 includes a steady-flow gas generator or engine 110 equipped with a duct or outlet 111, and axially aligned therewith is a flow distributor or interrupter in the general form of a rotary valve 114 provided with a large central opening or chamber 118 communicating with the engine outlet 111. The lower end portion of the valve is closed by a bottom wall, as in FIGURES 1 and 2, and the cylindrical side wall of the valve is provided with a plurality of wall segments 119 that define therebetween a plurality of outlets 120, each of which communicates with the large central opening 118 and is adapted to communicate with the various conduits 116.

In the specific structure shown, there are four valve outlets 120 angularly spaced from each other by 90°. In the drawings, only two of the outlets are shown, and these are denoted with the numeral 120a and 120b. The planes of the valve outlets 120 are substantially normal to the longitudinal axis of the opening or chamber 118 so that the gas flowing through the outlets makes a transition of approximately 90° in flow direction in moving therethrough; and to minimize turbulence and reduce the resistance to such transition, the bottom wall of the valve may be slightly curved. There are eight conduits, respectively identified with the numbers 116a through 116h, that extend radially outwardly from the longitudinal axis of the structure (the valve 114 in particular), and the inlet openings of the conduits are spaced apart by equal angular distances.

The conduits 116 are rigidly related to a central casing element 117 that rotatably receives the lower end portion of the valve 114 therein, and the casing element is provided with a plurality of openings that respectively communicate with the conduits 116 through tapered connector sections 112. Each of the valve outlets 120 has substantially the same cross sectional area as that of the respective conduit inlet openings defined by the casing element 117 and, additionally, the cross sectional areas of the openings are such that the divider walls 126 which separate the adjacent inlet openings are quite narrow, and in this sense are substantially non-existent. Therefore, when the valve 114 is rotated (by motor means, not shown, but which may be the motor means 15 illustrated in FIGURE 1 having its shaft suitably connected to the valve), to successively move the valve outlets into register with the various conduits 116, the total cross sectional area of the conduit inlets in communication with the valve outlets is substantially invariant.

Each of the conduits 116 has an elbow or 90° curvature at the outer end thereof, and terminates in a nozzle provided with a fluid discharge thrust opening 121 having a diameter O. The various discharge nozzles are disposed in parallel alignment, and the outlets thereof all face in the same direction so that the thrust forces resulting from the respective discharge of gases therefrom have the same sign or are arithmetically additive. Since the gases flowing through the conduits 116 change flow direction by substantially 90°, the gaseous discharge from the openings 121 is in the same direction as the gaseous flow through the engine outlet 111.

Disposed in facing and spaced relation with the nozzle thrust openings 121 is a support or carrier 123 fixedly related to the conduits 116 by connector straps or other suitable means (not shown). The member 123 is generally cylindrical, and is provided with a plurality of openings therethrough respectively aligned with the nozzle thrust outlets 121. The various openings are identified with the numerals 124a through 124h, and define thrust augmenters having substantially the same dimensional characteristics as the thrust augmenters 24 heretofore described. Since the thrust augmenters 124 are integrally defined by the member 123, the thickness thereof has the dimension L; the smallest diameter of each augmenter adjacent the inlet thereof is denoted by the dimension I; each such opening (and therefore the member 123) is spaced from the thrust outlets 121 by a distance S; and the augmenters are tapered from the inlet to an enlarged outlet such that the included angle thereof is designated by the letter A.

In operation of the structure illustrated in FIGURES 1 and 2, the steady-flow gas generator 10 is started, and the motor 15 energized to rotate the flow interrupter or valve 14. The continuous flow of gases being discharged from the engine outlet 11 flow into the valve 14 through the opening 18 thereof, and such flow will be divided into two streams—one flowing through the valve outlet 20a, and the other flowing through the valve outlet 20b. Since the valve 14 is rotating, and assuming initially the position thereof illustrated in FIGURE 2, the two gas streams respectively flowing through the valve outlets 20a and 20b will flow into the respective conduits 16a and 16c, and outwardly therefrom through their thrust discharge openings 21a and 21c.

Since the outlet openings 20a and 20b are substantially larger in angular width than the inlets of the conduits 16, the effective area of each valve passage outlet is substantially equivalent to the area of each conduit inlet opening. In view of this, and in consequence of the spacing between the conduit inlets, the gaseous flow through the valve 14 is continuously into and through an opening substantially of invariant area. More particularly, and with reference to FIGURE 2, and further assuming that the valve 14 is rotating in a counter-clockwise direction; when the trailing edge of the outlet opening of the valve outlet 20a is in substantial alignment with the adjacent edge of the inlet opening of the conduit 16a, the leading edge of the outlet 20a is in substantial alignment with the adjacent edge of the inlet opening of the conduit 16b. Therefore, as the outlet 20a is rotated into an incrementally increasing degree of register with the inlet opening of the conduit 16b, it is simultaneously and incrementally being rotated out of register with the inlet opening of the conduit 16a. Since such areas of engagement and disengagement are simultaneously changing at the same rate and to precisely the same degree, the valve opening 20a is always "looking at" or communicating with a flow opening of exactly the same cross sectional area. These same conditions pertain to the valve outlet 20b. Therefore, there is no interruption in the flow of gaseous fluid through the valve 14; and because there is no variation in the volume of such flow, no varying pressure change occurs across the valve and no pressure wave disturbances are propagated upstream thereof to the steady-flow gas generator 10.

Nevertheless, the gaseous flow through the various conduits 16 is strongly intermittent; and each time the flow through any of the conduits 16 is terminated, a pressure drop occurs thereby causing ambient fluid (air, etc.) to flow into the space between the outlet of the intermittent jet nozzle 21a and the inlet of the jet thrust augmenter 25. This pressure drop is accomplished in the following manner: When the rotating valve at 20a suddenly closes it institutes a rarefaction (expansion) wave which travels down the tube at sonic speed to the outlet 21a where it is reversed at the open end as a compression wave and travels back up the intermittent jet tube to the valve end of the tube. The arrival of the rarefaction wave at the open end of the jet tube 21a causes a pressure drop in the ambient fluid (air) surrounding the opening 21a which induces a flow of ambient (fresh) fluid (air) back into the intermittent jet tube, which refilling of the jet tube with ambient fluid increases the overall mass flow of the lift or propulsion system. Furthermore, ambient fluid is simultaneously drawn into position to be driven into the jet thrust augmenter by the intermittent jet blow-down from the succeeding cycle which acts like a jet piston as it passes from the opening 21a into and through the jet thrust augmenter 24. At the time of the reflection of such compression wave, the valve 14 (and more particularly, the divider wall 19 thereof) is closing the inlet to such conduit, and the pressure wave does not travel past the valve toward the steady-flow gas generator 10.

In view of the orientation of the conduits 16 and the inlet openings thereof and orientation of the valve outlets 20, it will be apparent that fluid flow occurs simultaneously through the diametrically aligned conduits 16a and 16c; and similarly, through the aligned conduits 16b and 16d Correspondingly, fluid flow is interrupted simultaneously through the respectively aligned conduits.

Referring to FIGURE 3, the operation of the structure is substantially the same as that of the embodiment illustrated in FIGURES 1 and 2. In particular, rotation of the interrupter or valve 114 will cause the outlets 120 to successively align with the various inlets to the flow conduits 116. Assuming a condition in which the valve outlet 120a is in alignment with the opening into the conduit 116a, the valve outlet 120b will be in register with the inlet opening to the flow conduit 116c. At the same time, the inlets to the conduits 116e and 116g will be respectively aligned with the valve outlets (not shown) which are respectively oriented in diametric alignment with the valve outlets 120a and 120b. Therefore, full flow occurs simultaneously through four of the conduits 116; and at such time, the flow is completely interrupted through the four alternate conduits 116.

Again in this embodiment of the invention, no pressure wave disturbances are propagated upstream of the valve 114 toward the steady-flow gas generator 110 because the four valve outlets 120 are always in communication with a conduit inlet area of substantially invariant size. That is to say, the walls 126 which separate the various inlet opening of the conduits 116 are quite thin, and the only change in the area viewed by the valve outlets is the difference as between a condition of precise register of each of the valve outlets with respective inlets of the conduits 116 and the condition when the valve outlets are being rotated into precise register with the next adjacent conduit inlets; and such difference results from the total area of the divider walls 126 which are then passing in front of the valve outlets. However, because this total area of any four divider walls 126 is substantially negligible, there is in effect substantially no change in the total cross sectional area of the flow conduit inlets which are in communication at any time with the outlets 120 of the valve.

Nevertheless, the gaseous flow into and through the various conduits 116 is strongly intermittent; and therefore, during each operating cycle and upon termination of the fluid flow, a sudden pressure drop occurs which creates a rarefaction wave that travels down the conduit to the open end or thrust outlet 121 thereof, where it is reflected as a compression wave that travels upstream to the valve 114 and a flow of ambient air into the conduit is induced. At such time, however, the conduit is closed by one of the divider walls 119 of the valve, so that such pressure wave cannot travel past the valve and to the steady-flow gas generator 110.

Returning to the embodiment of the invention illustrated in FIGURES 1 and 2 for a consideration of the function of the augmenters 24, and assuming for convenience of description a communication of the valve outlets 20a and 20b with the respective conduits 16a and 16c the gases intermittently passing through such conduits flow outwardly therefrom through the respective thrust openings 21 as a primary pulsating jet. A strong collision and momentum transfer takes place across the entire cross section or face of this primary jet as it travels into the augmenter 24 because of its engagement with the gaseous fluid therein. This causes a local pressure build-up along the contact surface and, therefore, a spreading of the primary jet so that it develops into the typical club or mushroom shape of a starting jet.

Behind the spreading head of the primary jet, friction between the jet and surrounding ambient fluid aids the development of incipient ring vortices that accelerate axially and expand radially. These incipient vortices may cause a minor amount of entrainment of secondary fluid into the jet—that is, ambient air that contacts the primary jet through the space S between the thrust discharge outlet and inlet of the augmenter. Such vortices travel faster than the mushroom-shaped head of the primary jet, and therefore they overtake, pass inside of, and become a part of this head which is developing into a large ring vortex. A vigorous entrainment of secondary air is caused by the collision of the primary pulsating jet with the secondary fluid across the face of the jet—the primary jet acting as a fluid piston to force such secondary fluid through the augmenter. The pressure drop that occurs behind such fluid piston causes an inflow of ambient fluid into the thrust augmenter over the lip thereof resulting in a pressure drop on the lip which provides a source of augmenter thrust.

As the valve 14 rotates the outlets 20a and 20b out of register with the respective conduits 16a and 16c, the primary jet discharging from each of these conduits necks down and then vanishes from the nozzle. The momentum of the fluid flowing outwardly from the conduits causes an over expansion and partial evacuation of each conduit. As stated before, this causes a pressure drop therein and a consequent rarefaction wave which travels down the conduit to the discharge opening 21 thereof where it is reflected back toward the valve 14, thereby inducing a back-flow of secondary fluid or ambient air into the conduit through the discharge opening 21 thereof. Thus, a back-and-forth flow of fluid occurs through each thrust outlet opening 21, with the result that each conduit 16 is refilled and packed with a fresh quantity of secondary fluid or ambient air after each pulsating discharge, which is then in position in front of the next jet flow of fluid through the conduit from the valve 14 and is forced or pumped through the augmenter by the piston-like action of the primary pulsating jet then flowing through the conduit in such next cycle of operation.

It should be noted that there is a flow of secondary fluid or ambient air past the flared lip 25 of the augmenter inlet opening and into the augmenter to substantially refill the same with fresh air in each sequence of the operating cycle and at substantially the same time that the back flow occurs into the associated conduit. Therefore, there is a fairly continuous thrust force acting on the augmenter even during the period of flow reversal back into the conduit 16.

As stated hereinbefore, it has been found critical to have the ratio of the length L of the augmenter 24 to the diameter I thereof at the inlet opening relatively small, in contradistinction to the relatively large ratios that have heretofore been used. This is to allow scavenging of the primary jet from the augmenter 24 in each cycle of operation, whereby substantially all of the fluid escapes therefrom in each such cycle and the augmenter is subsequently refilled by the flow of air thereto while air is also flowing into the conduit 16 all without creating substantial flow interference between the primary jet and the secondary fluid flow in the subsequent cycle. The ideal length compared to the diameter of the augmenter should be such that each pulsating primary jet completely escapes from the augmenter in each operating cycle.

Also, in association with the length-to-diameter ratio, it is important that the ratio of the cross sectional area of the augmenter inlet opening to the cross sectional area of the thrust discharge outlet 21 be within prescribed limits to allow for expansion of the primary jet discharged from the thrust opening in each cycle of operation which, as previously explained, expands to club or mushroom shape; and at the same time, the cross sectional area of the augmenter inlet opening desirably should be small enough to conform substantially to the maximum diameter of the club-shaped jet so as to provide an efficient seal of such jet with the inner surface of the augmenter wall, thus enhancing the piston-like ramming effect heretofore described. Therefore, the cross sectional area of the augmenter inlet opening should not be materially greater than the maximum area of the jet club; otherwise, the sealing effect it lessened, which results in thrust losses. Further, the cross sectional area of the augmenter inlet opening should not be materially less than the maximum area of the jet club, for then thrust losses would occur because development of the club-shaped jet would be restricted or choked.

Based on tests, it has been found that the ratio of the length L of the augmenter to the diameter I of the inlet opening at the narrowest part thereof should be in the range of about 1–1 to 1–4.5. With this ratio of length to diameter, the ratio of the cross sectional area of the augmenter inlet opening at the narrowest part thereof to the cross sectional area of the nozzle thrust opening at its narrowest part should be in the range of about 3–1 to 12–1. The spacing S between the augmenter and the nozzle thrust opening should be in the range of about 1 to 2.5 times the diameter O of the nozzle thrust opening, and with such space open to the flow of secondary fluid throughout substantially 360°.

The foregoing ratios apply to cylindrical augmenters as well as to the tapered augmenters illustrated in FIGURE 1. However, further increases in thrust augmentation can be obtained where the augmenter is tapered in a generally frusto-conical shape, with its smallest diameter at the inlet opening thereof adjacent the thrust discharge nozzle 21. Marked increase in thrust has been found to commence when the included angle A between diametrically opposite parts of the inner surface of the tapered wall of the augmenter is about 4°, with maximum thrust increase occurring at a relatively large angle of about 8°. Beyond 8°, the thrust augmentation decreases gradually until an angle of 24° is reached; and beyond 24°, thrust decreases rapidly. Up to an angle of 4°, there is only moderate thrust increase. The range of the included angle then is desirably between 4° and 12°.

With respect to the embodiment illustrated in FIGURE 3, the same dimensional relationships pertain; and therefore the length of the augmenters 124 are designated by the dimension L, the diameter thereof at the smallest part of the inlet opening is designated with the letter I, the included angle of the taper is denoted as A, and the diameter of the nozzle thrust outlet opening is designated with the letter O. Similarly, the spacing between the augmenter inlet openings and their respective nozzle thrust openings 121 is designated by the letter S.

The particular ratios set forth have been found to apply substantially irrespective of the size and capacity of the structures, and an increase in thrust augmentation in excess of 140% has been obtained in the inventive devices in contrast to conventional augmentation devices which increase thrust by an amount somewhat in excess of 15%.

It should be noted that the conduits 16 and 116 are fixedly related with respect to their associated thrust augmenters so that no relative movement is permited therebetween. Additionally, the conduits are non-rotating components and, therefore, no centrifugal forces are imparted to the gases flowing therethrough. Furthermore, the rotary interrupters 14 and 114 are in the nature of thin-walled sleeve valves so that the only tendencies thereof to rotate the fluid flowing therethrough result from skin friction between the surface of the rotating sleeve and fluid and from contact of the thin edges of the sleeve with the fluid. Consequently, substantially no Coriolis losses occur in the system since the impartation of angular motion to the gaseous fluid has been substantially eliminated. The non-rotating character of the fluid flowing through the valve also greatly reduces the power necessary to rotate the valve.

Since rotation is imparted to the valves through a variable speed motor, the rotational velocity of the valves may be tuned to the natural frequency of the conduits 16 or 116, which is desirable because it has been found that such tuning advantageously influences the thrust augmentation attained. Generally, the rotational velocity of the valves will be such that the frequency of the pulsating fluid discharges from the various conduits will be in the range of about 40 to 400 cycles per second, although such range is not a limiting consideration. Additionally, there is an important relationship between the time available for blow-down and the time available for refill of the intermittent jet tubes 16 and the ratio therebetween must be such that the jet tubes have sufficient time to refill, and the angular velocity of the rotating valve must be synchronized with the frequency of the rarefaction waves to produce such results in order to achieve optimum performance.

Apparatus constructed in accordance with the invention is found to remain relatively cool during operation thereof, and, as a specific example, the temperature of the gases discharging from the augmenters in certain particular structures have been found to have a temperature of approximately 200° F. and a velocity of approximately 200 feet per second at a distance from the augmenter outlet equal to about seven times the diameter of the nozzle discharge outlets 21. This is in contrast to the commonly experienced conditions of approximately 750° F. and a velocity 1000 feet per second in a typical turbo-jet engine. Since the structure remains cool, this permits the use of cheaper materials and lighter weight materials, as, for example, synthetic thermo-setting resin plastics, such as polyethylene and polyurethane, for the support members 23 and 123. There is also a reduction in the noise level of the apparatus as a result of the reduction in the exit velocity of the discharging gases, and greater thrust output is obtained as a result of the lower temperature of the discharging gases.

The apparatus is also useful for testing the effect of intermittent jet blow-down velocity by (1) varying the pressure ratio across the jet tubes, i.e. by varying the upstream pressure from the gas generator device, and (2) properly shaping the jet tube 16 for supersonic flow when the upstream pressure is sufficiently high to provide supersonic flow.

While in the foregoing specification embodiments of the invention have been set forth in considerable detail for purposes of making an adequate disclosure thereof, it will be apparent to those skilled in the art that numerous changes may be made in such details without departing from the spirit and principles of the invention.

I claim:

1. The combination with a gas generator operative to produce a steady-flow gaseous discharge: of a converter for changing a steady fluid flow into an intermittent flow without propagation of substantial pressure wave disturbances upstream toward said gas generator, comprising a flow distributor having an inlet communicating with said gas generator for receiving such steady-flow gaseous discharge therefrom and having also at least one outlet in open communication with said inlet and being movable along a predetermined path, a plurality of rotationally fixed outlet nozzles each terminating in a field discharge thrust opening and each having an inlet disposed along such predetermined path for communication with said flow distributor outlet, motor means connected with said flow distributor for moving said outlet thereof along such predetermined path and into successive and repetitive communication with each of said nozzle inlets to effect a cyclic intermittent flow of gaseous fluid therethrough, said flow distributor outlet and all of said nozzle inlets being dimensioned and oriented so that the effective nozzle inlet area in communication with said distributor outlet is at all times of substantially invariant size with the result that there is substantially no interruption in the flow of gaseous fluid through said flow distributor and therefore substantially no varying pressure changes thereacross, whereby upstream propagation of substantial pressure wave disturbances is obviated even though the gaseous fluid flow through each of said nozzles is strongly intermittent; and a plurality of thrust augmenters respectively associated with said outlet nozzles and each thrust augmenter having an inlet opening adjacent the associated thrust opening for receiving the cyclic discharges of fluid therefrom.

2. The combination with a gas generator operative to produce a steady-flow gaseous discharge: of a converter for changing a steady fluid flow into an intermittent flow without propagation of substantial pressure wave disturbances upstream toward said gas generator, comprising a flow distributor having an inlet communicating with said gas generator for receiving such steady-flow gaseous discharge therefrom and having also at least one outlet in open communication with said inlet and being movable along a predetermined path, a plurality of rotationally fixed outlet nozzles each terminating in a fluid discharge thrust opening and each having an inlet disposed along such predetermined path for communication with said flow distributor outlet, motor means connected with said flow distributor for moving said outlet thereof along such predetermined path and into sucessive and repetitive communication with each of said nozzle inlets to effect a cyclic intermittent flow of gaseous fluid therethrough, said flow distributor outlet and all of said nozzle inlets being dimensioned and oriented so that the effective nozzle inlet area in communication with said distributor outlet is at all times of substantially invariant size with the result that there is substantially no interruption in the flow of gaseous fluid through said flow distributor and therefore substantially no varying pressure changes thereacross, whereby upstream propagation of substantial pressure wave disturbances is obviated even though the gaseous fluid flow through each of said nozzles is strongly intermittent; and a plurality of hollow thrust augmenters respectively associated with said outlet nozzles and each thrust augmenter having an inlet opening adjacent the associated thrust opening for receiving the cyclic discharge of fluid therefrom and being axially spaced from such adjacent thrust opening to provide an open space therebetween accomodating the flow of ambient fluid into both the thrust augmenter inlet opening and nozzle thrust opening, the ratio of the length of each of said augmenters to the diameter thereof adjacent its inlet opening being relatively small and in the range of about 1–4.5 to 1 to allow scavenging of fluid from said augmenters in each cycle of fluid discharge from the respectively associated thrust openings without creating substantial fluid flow interference with the subsequent cycles of discharge therefrom, and the ratio of the cross sectional area of each of said augmenter inlet openings to that of the respectively associated nozzle thrust openings being about 3–12 to 1 to allow for both expansion of the fluid discharged from each nozzle thrust opening in each discharge cycle and efficient sealing of the discharged fluid with the walls of said augmenters, the axial spacing between each augmenter inlet opening and the respectively associated nozzle thrust openings being about 1–2.5 times the diameter of the nozzle thrust opening.

3. The combination with a gas generator operative to produce a steady-flow gaseous discharge: of a converter for changing a steady fluid flow into an intermittent flow without propagation of substantial pressure wave disturbances upstream toward said gas generator, comprising a flow distributor having an inlet communicating with said gas generator for receiving such steady-flow gaseous discharge therefrom and having also at least one outlet in open communication with said inlet and being movable along a predetermined path, a plurality of rotationally fixed outlet nozzles each terminating in a fluid discharge thrust opening and each having an inlet disposed along such predetermined path for communication with said flow distributor outlet, motor means connected with said flow distributor for moving said outlet thereof along such predetermined path and into successive and repetitive communication with each of said nozzle inlets to effect a cyclic intermittent flow of gaseous fluid therethrough, said flow distributor outlet and all of said nozzle inlets being dimensioned and oriented so that the effective nozzle inlet area in communication with said distributor outlet is at all times of substantially invariant size with the result that there is substantially no interruption in the flow of gaseous fluid through said flow distributor and therefore substantially no varying pressure changes thereacross, whereby upstream propagation of substantial pressure wave disturbances is obviated even though the gaseous fluid flow through each of said nozzles is strongly intermittent.

4. The combination with gas generator operative to produce a steady-flow gaseous discharge: of a converter for changing a steady fluid flow into an intermittent flow without propagation of substantial pressure wave disturbances upstream toward said gas generator, comprising a rotary flow distributor having an inlet communicating with said gas generator for receiving such steady-flow gaseous discharge therefrom and having also a plurality of outlets each communicating with said inlet for receiving such steady flow therefrom and being movable along a predetermined path, a plurality of rotationally fixed outlet nozzles each terminating in a fluid discharge thrust opening and each having an inlet disposed along such predetermined path for communication with said flow distributor outlets, motor means connected with said flow distributor for rotating the same to move said outlets thereof along such predetermined path and into successive and repetitive communication with each of said nozzle inlets to effect a cyclic intermittent flow of fluid therethrough, said nozzle inlets and said distributor outlets being angularly spaced and disposed so that at least two of said nozzle inlets are simultaneously in communication with two of said distributor outlets, and said flow distributor outlets and all of said nozzle inlets being dimensioned and oriented so that the effective nozzle inlet area in communication with said distributor outlets is at all times of substantially invariant size with the result that there is substantially no interruption in the flow of gaseous fluid through said flow distributor and therefore substantially no varying pressure changes thereacross, whereby upstream propagation of substantial pressure wave disturbances is obviated even though the gaseous fluid flow through each of said nozzles is strongly intermittent.

5. In combination: a converter for changing a steady fluid flow into an intermittent flow without propagation of substantial pressure wave disturbances upstream toward the source of such steady fluid flow, comprising a flow distributor having an inlet for receiving such steady fluid flow and at least on outlet in open communication with said inlet and being movable along a predetermined path, a plurality of rotationally fixed outlet nozzles each terminating in a fluid discharge thrust opening and each having an inlet disposed along such predetermined path for communication with said flow distributor outlet, motor means connected with said flow distributor for moving said outlet thereof along such predetermined path and into successive and repetitive communication with each of said nozzle inlets to effect a cyclic intermittent flow of gaseous fluid therethrough, said flow distributor outlet and all of said nozzle inlets being dimensioned and oriented so that the effective nozzle inlet area in communication with said distributor outlet is at all times of substantially invariant size with the result that there is substantially no interruption in the flow of gaseous fluid through said flow distributor and therefore substantially no varying pressure changes thereacross, whereby upstream propagation of substantial pressure wave disturbances is obviated even though the gaseous fluid flow through each of said nozzles is strongly intermittent; and a plurality of thrust augmenters respectively associated with said outlet nozzles and each thrust augmentor having an inlet opening adjacent the associated thrust opening for receiving the cyclic discharges of fluid therefrom.

6. In combination: a converter for changing a steady fluid flow into an intermittent flow without propagation of substantial pressure wave disturbances upstream toward the source of such steady fluid flow, comprising a flow distributor having an inlet for receiving such steady fluid flow and at least one outlet in open communication with said inlet and being movable along a predetermined path, a plurality of rotationally fixed outlet nozzles each terminating in a fluid discharge thrust opening and each having an inlet disposed along such predetermined path for communication with said flow distributor outlet, motor means connected with said flow distributor for moving said outlet thereof along such predetermined path and into successive and repetitive communication with each of said nozzle inlets to effect a cyclic intermittent flow of gaseous fluid therethrough, said flow distributor outlet and all of said nozzle inlets being dimensioned and oriented so that the effective nozzle inlet area in communication with said distributor outlet is at all times of substantially invariant size with the result that there is substantially no interruption in the flow of gaseous fluid through said flow distributor and therefore substantially no varying pressure changes thereacross, whereby upstream propagation of substantial pressure wave disturbances is obviated even though the gaseaous fluid flow through each of said nozzles is strongly intermittent; and a plurality of hollow thrust augmenters respectively associated with said outlet nozzles and each thrust augmenter having an inlet opening adjacent the associated thrust opening for receiving the cyclic discharge of fluid therefrom and being axially spaced from such adjacent thrust opening to provide an open space therebetween accommodating the flow of ambient fluid into both the thrust augmenter inlet opening and nozzle thrust opening, the ratio of the length of each augmenter to the diameter thereof adjacent its inlet opening being relatively small and in the range of about 1–4.5 to 1 to allow scavenging of fluid therefrom in each cycle of fluid discharge from the thrust opening associated therewith without creating substantial fluid flow interference with the subsequent cycle of discharge therefrom, and the ratio of the cross sectional area of each augmenter inlet opening to that of the associated nozzle thrust opening being about 3–12 to 1 to allow for both expansion of the fluid discharged from the associated nozzle thrust opening in each discharge cycle and efficient sealing of the discharged fluid with the walls of the associated augmenter.

7. The combination of claim 6 in which said nozzles extend in the same general direction.

8. A converter for changing a steady fluid flow into an intermittent flow without propagation of substantial pressure wave disturbances upstream toward the source of such steady flow, comprising a flow distributor having an inlet for receiving such steady fluid flow and having also at least one outlet in open communication with said inlet and being movable along a predetermined path, a plurality of rotationally fixed outlet nozzles each terminating in a fluid discharge thrust opening and each having an inlet disposed along such predetermined path for communication with said flow distributor outlet, motor means connected with said flow distributor for moving said outlet thereof along such predetermined path and into successive and repetitive communication with each of said nozzle inlets to effect a cyclic intermittent flow of fluid therethrough, and said flow distributor outlet and all of said nozzle inlets being dimensioned and oriented so that the effective nozzle inlet area in communication with said distributor outlet is at all times of substantially invariant size with the result that there is substantially no interruption in the flow of gaseous fluid through said flow distributor and therefore substantially no varying pressure changes thereacross, whereby upstream propagation of substantial pressure wave disturbances is obviated even though the gaseous fluid flow through each of said nozzles is strongly intermittent.

9. The converter of claim 8 in which said flow distributor is provided with a pair of outlets each of which is in open communication with said inlet thereof and is movable along the aforesaid predetermined path, said distributor outlets being oriented for simultaneous communication with certain of said nozzle inlets.

10. A converter for changing a steady fluid flow into an intermittent flow without propagation of substantial pressure wave disturbance upstream toward the source of such steady flow, comprising a rotary flow distributor having an inlet for receiving such steady flow and having also a plurality of outlets each communicating with said inlet for receiving such steady flow therefrom and being movable along a predetermined path, a plurality of rotationally fixed outlet nozzles each terminating in a fluid discharge thrust opening and each having an inlet disposed along such predetermined path for communication with said flow distributor outlets, motor means connected with said flow distrbutor for rotating the same to move said outlets thereof along such predetermined path and into successive and repetitive communication with each of said nozzle inlets to effect a cyclic intermittent flow of fluid therethrough, said nozzle inlets and said distributor outlets being angularly spaced and disposed so that at least two of said nozzle inlets are simultaneously in communication with two of said distributor outlets, and said flow distributor outlets and all of said nozzle inlets being dimensioned and oriented so that the effective nozzle inlet area in communication with said distributor outlets is at all times of substantially invariant size with the result that there is substantially no interruption in the flow of gaseous fluid through said flow distributor and therefore substantially no varying pressure changes thereacross, whereby upstream propagation of substantial pressure wave disturbances is obviated even though the gaseous fluid flow through each of said nozzles is strongly intermittent.

11. The converter of claim 10 in which there are an even number of outlet nozzles spaced from each other by equal angular distances, and in which there are an even number of distributor outlets spaced from each other by equal angular distances.

12. The converter of claim 10 in which all of said discharge nozzles extend in the same general direction so that the thrust discharges therefrom are arithmetically additive.

References Cited by the Examiner

UNITED STATES PATENTS

| 2,515,644 | 7/50 | Goddard | 60—39.39 |
| 2,771,257 | 11/56 | Doolittle | 60—39.35 |
| 2,808,115 | 10/57 | Peterson | 60—39.35 |

FOREIGN PATENTS

| 761,726 | 11/56 | Great Britain. |
| 484,609 | 9/53 | Italy. |

SAMUEL LEVINE, *Primary Examiner.*

ABRAM BLUM, *Examiner.*